United States Patent [19]
Hunter

[11] Patent Number: 5,724,062
[45] Date of Patent: *Mar. 3, 1998

[54] HIGH RESOLUTION, HIGH BRIGHTNESS LIGHT EMITTING DIODE DISPLAY AND METHOD AND PRODUCING THE SAME

[75] Inventor: C. Eric Hunter, Chapel Hill, N.C.

[73] Assignee: Cree Research, Inc., Durham, N.C.

[*] Notice: The term of this patent shall not extend beyond the expiration date of Pat. No. 5,359,345.

[21] Appl. No.: 310,260

[22] Filed: Sep. 21, 1994

Related U.S. Application Data

[63] Continuation-in-part of Ser. No. 926,035, Aug. 5, 1992, Pat. No. 5,359,345.

[51] Int. Cl.⁶ .................................................. G09G 3/36
[52] U.S. Cl. ........................................... 345/102; 345/83
[58] Field of Search ........................... 345/102, 46, 82, 345/83, 207; 359/48, 39, 49

[56] References Cited

U.S. PATENT DOCUMENTS

| | | |
|---|---|---|
| 3,569,614 | 3/1971 | Hanlon . |
| 3,776,615 | 12/1973 | Tsukamoto et al. . |
| 4,180,813 | 12/1979 | Yoneda . |
| 4,368,963 | 1/1983 | Stolov . |
| 4,410,887 | 10/1983 | Stolov et al. . |
| 4,491,863 | 1/1985 | Kuruhashi ........................ 345/83 |
| 4,581,608 | 4/1986 | Aftergut et al. . |
| 4,712,878 | 12/1987 | Taniguchi et al. . |
| 4,716,403 | 12/1987 | Morozumi . |
| 4,744,640 | 5/1988 | Phillips . |
| 4,799,050 | 1/1989 | Prince et al. . |
| 4,870,484 | 9/1989 | Sonehara . |
| 4,907,862 | 3/1990 | Suntola . |
| 4,912,064 | 3/1990 | Kong et al. . |
| 4,917,465 | 4/1990 | Conner et al. . |
| 4,918,497 | 4/1990 | Edmond . |
| 4,924,215 | 5/1990 | Nelson . |

(List continued on next page.)

FOREIGN PATENT DOCUMENTS

0541373A2  5/1993  European Pat. Off. .

OTHER PUBLICATIONS

"Flat panel displays challenge the CRT"; Robert Miller, Uticor Technology, Inc.; I&CS (May 1989) pp. 39–41.

"Technology Newsletter"; Electronic Design (Jan. 11, 1990) p. 25.

"Displays Getting Bigger, Brighter, More Colorful"; Milt Leonard; Electronic Design (May 11, 1989) pp. 57, 58, and 60.

IEE The Display Makers; Industrial Electronic Engineers; California.

"Expanding Displays Seize New Functions"; David Maliniak; Electronic Design (May 24, 1990) pp. 29–31.

"The Picture Brightens In Flat–Panel Technology"; Tom Manuel; Electronics (May 28, 1987) pp. 55–64.

(List continued on next page.)

*Primary Examiner*—Regina D. Liang
*Attorney, Agent, or Firm*—Philip Summa, Patent Attorney

[57] ABSTRACT

A high resolution, high brightness, full color display is provided having a liquid crystal pixel selectably addressable during a predetermined time period, a set of at least one red, one green, and one blue color light emitting diodes positioned adjacent the liquid crystal pixel for emitting light through the liquid crystal pixel, and means connected to the liquid crystal pixel for addressing the liquid crystal pixel a plurality of times during the predetermined time period for each color so as to provide persistence when changes in color are perceived by the human eye. A method of producing a high resolution, full color display is also provided by lighting a set of one red, one green, and one blue light emitting diodes by lighting the respective colored light sources for a predetermined time period for each color and shuttering the set of light sources with a liquid crystal pixel for at least a portion of the predetermined time period to thereby emit light from the shuttered pixel for a selected time period so as to provide persistence when changes in color are perceived by the human eye.

17 Claims, 5 Drawing Sheets

U.S. PATENT DOCUMENTS

| | | |
|---|---|---|
| 4,929,061 | 5/1990 | Tominaga et al. . |
| 4,978,952 | 12/1990 | Irwin . |
| 4,992,704 | 2/1991 | Stinson . |
| 5,011,549 | 4/1991 | Kong et al. . |
| 5,027,168 | 6/1991 | Edmond . |
| 5,063,421 | 11/1991 | Suzuki et al. . |
| 5,087,576 | 2/1992 | Edmond et al. . |
| 5,093,652 | 3/1992 | Bull et al. . |
| 5,103,328 | 4/1992 | Numao . |
| 5,187,547 | 2/1993 | Niina et al. . |
| 5,243,204 | 9/1993 | Suzuki et al. . |
| 5,247,533 | 9/1993 | Okazaki et al. . |
| 5,273,933 | 12/1993 | Hatano et al. . |
| 5,290,393 | 3/1994 | Nakamura . |
| 5,302,839 | 4/1994 | Kaise et al. . |
| 5,305,464 | 4/1994 | Frett ................................. 345/207 |
| 5,306,662 | 4/1994 | Nakamura et al. . |
| 5,307,359 | 4/1994 | Sarraf . |
| 5,359,345 | 10/1994 | Hunter ............................... 345/102 |
| 5,394,167 | 2/1995 | Migny ............................... 345/147 |

OTHER PUBLICATIONS

"Perfecting the picture"; Charles M. Apt, Arthur D. Little Inc.; IEEE Spectrum (Jul. 1985) pp. 60–66.

"Design engineers take second look at flat panel displays"; Ed Motokane; I&CS (Apr. 1988) pp. 69–72.

"Effifcient Green–Emitting Silicon Carbide Diodes"; Vodakov et al.; Sov. Phys. Semicond., vol. 26, No. 1 (Jan. 1992), pp. 59–61.

"Greatly Improved 3C–SiC p–n Junction Diodes Grown by Chemical Vapor Deposition"; Neudeck et al.; IEEE Electron Device Letters, vol. 14, No. 3 (Mar. 1993), pp. 136–139.

"Three–Color Blue–Green–Red Display Made from One Single Crystal"; Dmitriev et al.; Sov. Tech. Phys. Lett., vol. 12, No. 5 (May 1986), p. 221.

"Light–Emitting Diodes Made From Silicon Carbide Bombarded With Fast Electrons"; Vodakov et al.; Sov. Phys. Semicond., vol. 26, No. 11 (Nov. 1992), pp. 1041–1043.

"SiC–Based Solid Solutions: Technology and Properties"; V.A. Dmitriev; Springer Proceedings in Physics, vol. 56 (1992), pp. 3–14.

"Influence of Buffer Layers on the Deposition of High Quality Single Crystal GaN Over Sapphire Substrates"; J.N. Kuznia et al.; J. Appl. Phys., vol. 73, No. 9 (May 1993), pp. 4700–4702.

"The Nature of Donor Conduction in n–GaN"; M. Asif Khan et al.; J. Appl. Phys., vol. 74, No. 9 (Nov. 1993), pp. 5901–5903.

"Effects of AlN Buffer Layer on Crystallographic Structure and on Electrical and Optical Properties of GaN and $Ga_{1-x}Al_xN$ ($0<x\leq0.4$) Films Grown on Sapphire Substrate by MOVPE"; Isamu Akasaki et al.; Journal of Crystal Growth, vol. 98 (1989), pp. 209–219.

"GaN Growth Using GaN Buffer Layer"; Shuji Nakamura; Japanese Journal of Applied Physics, vol. 30, No. 10A (Oct. 1991), pp. L1705–L1707.

"Candela–Class High–Brightness InGaN/AlGaN Double–Heterostructure Blue–Light–Emitting Diodes"; Shuji Nakamura et al.; Appl. Phys. Lett., vol. 64, No. 13 (Mar. 1994), pp. 1687–1689.

"InGaN/AlGaN Double–Heterostructure Blue LEDs"; Shuji Nakamura (undated).

HIGH RESOLUTION, HIGH BRIGHTNESS LIGHT EMITTING DIODE DISPLAY AND METHOD AND PRODUCING THE SAME

RELATED APPLICATION

This application is a continuation-in-part of copending U.S. patent application Ser. No. 07/926,035 filed on Aug. 5, 1992, U.S. Pat. No. 5,359,345.

FIELD OF THE INVENTION

This invention generally relates to display devices and more particularly to an array of light emitting diodes in combination with a liquid crystal display for producing a high resolution, high brightness, full color display.

BACKGROUND OF THE INVENTION

For many years, the cathode ray tube ("CRT") dominated the display market for numerous applications. CRTs provided high resolution, graphics, full color, and real-time animation. CRT displays, however, have several associated problems such as bulkiness, high voltage requirements, high heat generation, and sensitivity to vibration and shock.

Because of the problems associated with CRT displays, other display technologies such as the light emitting diode ("LED"), liquid crystal display ("LCD"), vacuum fluorescent ("VF"), plasma, and electroluminescence have been replacing CRT displays for many applications, especially for flat panel display applications. These technologies have various advantages in specific applications, depending on such factors as environmental conditions, voltage requirements, and size.

LED displays have been used for many years and have been popular because of their ruggedness, fast switching speeds, and wide range of sizes. These advantages, however, were somewhat diminished by the fact that blue LEDs were difficult to develop and were expensive. Without the blue LED, a full color LED display was impossible.

The lack of a blue LED slowed the development and marketability of LED display technology, especially for multi-color applications such as personal computers, computer aided design ("CAD"), and video imaging. The need for a blue LED encouraged the development of the inventions described in U.S. Pat. Nos. 4,918,497 and 5,027,168 by Edmond titled "Blue Light Emitting Diode Formed In Silicon Carbide." The silicon carbide blue LED technology, in turn, has opened the field for the development of multi-color LED displays.

LCDs have been popular for many applications, primarily in low power areas such as battery-powered systems (e.g., wrist watches, portable computers) or small size applications. LCDs, however, have suffered from several problems over the years. LCDs, for example, are difficult to view in low ambient light environments because they transmit rather than emit light. In addition, LCDs have a limited viewing angle and poor contrast.

For full color displays, supertwist LCD technology has been developed to allow a wide variety of colors and improved contrast. Supertwist technology, for example, bends light 270 degrees instead of the 90 degrees provided by conventional LCD technology. The supertwist color LCDs still lack the clarity and brightness achieved by CRT displays and LED displays.

More recently, due to the problems with LED and LCD technology, LCDs have been used in combination with LEDs to attempt to achieve better clarity and brightness for flat panel displays over the full-color spectrum, especially for three-dimensional, multi-color, high resolution applications. To overcome the need for a blue LED, various filters and other devices have been used to produce the blue color when needed. Most of these alternative blue color techniques, however, added additional circuitry and expense and, therefore, were still not adequate for commercial applications.

One such method for producing a full color, flat panel display is to form a display with three colored filters (e.g., red, green, blue) for each LCD pixel. A mixture of the filtered light shines through the LCD pixel to display the desired color for that particular pixel. An example of this filter method is seen in U.S. Pat. No. 4,716,403 to Morozumi titled "Liquid Crystal Display Device." Although this is a theoretically simple solution, the filter system fails to allow the intensity of individual colors of light for an individual pixel to be controlled.

Another method is to use fewer LED sources and to project or scan the light sources over a large number of LCD pixels. As the light source is directed to a particular pixel, it lights the pixel with the appropriate color. As long as the entire display is covered in one-sixtieth (1/60th) of a second or less—a rate above which the human eye generally cannot detect the individual changes taking place—an appropriate image can be maintained. An example of such a device may be seen in U.S. Pat. No. 4,978,952 to Irwin titled "Flat Screen Color Video Display."

In the scanning method, as shown in U.S. Pat. No. 4,978,952 to Irwin, LEDs are used as individual light sources, and LCDs are used as shutters that define each pixel. The LCD pixels are opened and closed a row or column at a time in an appropriate manner to allow the LED light source to emit through the pixels and thereby define the overall display. The intensity of color transmitted is varied by varying the output of the source LEDs.

One problem with the scanning method, however, is a lack of power output which from a practical standpoint results in a lack of brightness, clarity, and overall resolution. The fundamental difficulty is that a row or column of LCD pixels at a time is illuminated from its source. Even if that time period for illuminating an entire row or column of LCDs is very short and refreshed very rapidly, the brightness is greatly affected. Therefore, the overall power output of the display is roughly limited by the ratio of sources to pixels in that row.

Other similar attempts at addressing this problem have been made by transferring the color to the screen a lattice or group of pixels at a time. An example of this may be seen in U.S. Pat. No. 5,093,652 to Bull et al. titled "Display Device." Because this device also controls blocks of pixels at a time, instead of individual pixels, it fails to produce the desired high resolution needed for video imaging applications. Also, the original patent application for this device was filed in a foreign country on Dec. 4, 1987, prior to the development of a commercially viable blue LED.

In addition, U.S. Pat. No. 4,907,862 by Suntola titled "Method For Generating Electronically Controllable Color Elements And Color Display Based On The Method" describes transferring the color to a row or a column of pixels one "line-at-a-time." Because this device likewise controls blocks of pixels, i.e., rows or columns, at a time, instead of individual pixels, it fails to produce the desired high resolution, high brightness needed for video imaging applications. Also, the original patent application for this device was filed in a foreign country on Feb. 25, 1986, also prior to the development of a commercially viable blue LED.

Thus, no high resolution, high brightness, full color video, flat panel display presently exists that uses a reasonable amount of power and still provides the high brightness, i.e., high light output intensity, full color, and high resolution required for video imaging applications.

SUMMARY OF THE INVENTION

Therefore, it is an object of the present invention to provide a high resolution, high brightness, full color display by lighting LEDs and shuttering individual pixels of an LCD as the light from the LEDs is emitted therethrough so that changes in color emitted from LEDs through the LCD are not perceived by the human eye.

It is also an object of the present invention to provide a high resolution, high brightness, full color, flat panel display that selectably addresses individual liquid crystal pixels at a rate fast enough so as to allow color wrapping and persistence to occur when viewing the display.

The present invention particularly meets these objects by a display having a liquid crystal pixel of an LCD selectably addressable during a predetermined time period and used to shutter an adjacent set of light emitting diodes having at least one red, one green, and one blue light source so as to provide persistence when changes in color are perceived by the human eye. The invention also includes a method of producing a high resolution, high brightness, full color display. The method preferably has the steps of lighting a set of one red, one green, and one blue light emitting diodes by lighting each respective colored light emitting diode in the set for a predetermined time period and shuttering the set of light emitting diodes with a liquid crystal pixel for at least a portion of the predetermined time period to thereby emit light from the shuttered pixel for a selected time period from each of the red, green, and blue light emitting diodes so as to provide persistence when changes in color are perceived by the human eye.

BRIEF DESCRIPTION OF DRAWINGS

Some of the objects and advantages of the present invention having been stated, others will become apparent as the description proceeds when taken in conjunction with the accompanying drawings in which.

DETAILED DESCRIPTION OF A PREFERRED EMBODIMENT

The present invention now will be described more fully hereinafter with reference to the accompanying drawings in which a preferred embodiment of the invention is shown. This invention may, however, be embodied in many different forms and should not be construed as limited to the illustrated embodiments set forth herein; rather, these embodiments are provided so that this disclosure will be thorough and complete and will fully convey the scope of the invention to those skilled in the art. Like numbers refer to like elements throughout.

Figure 1:
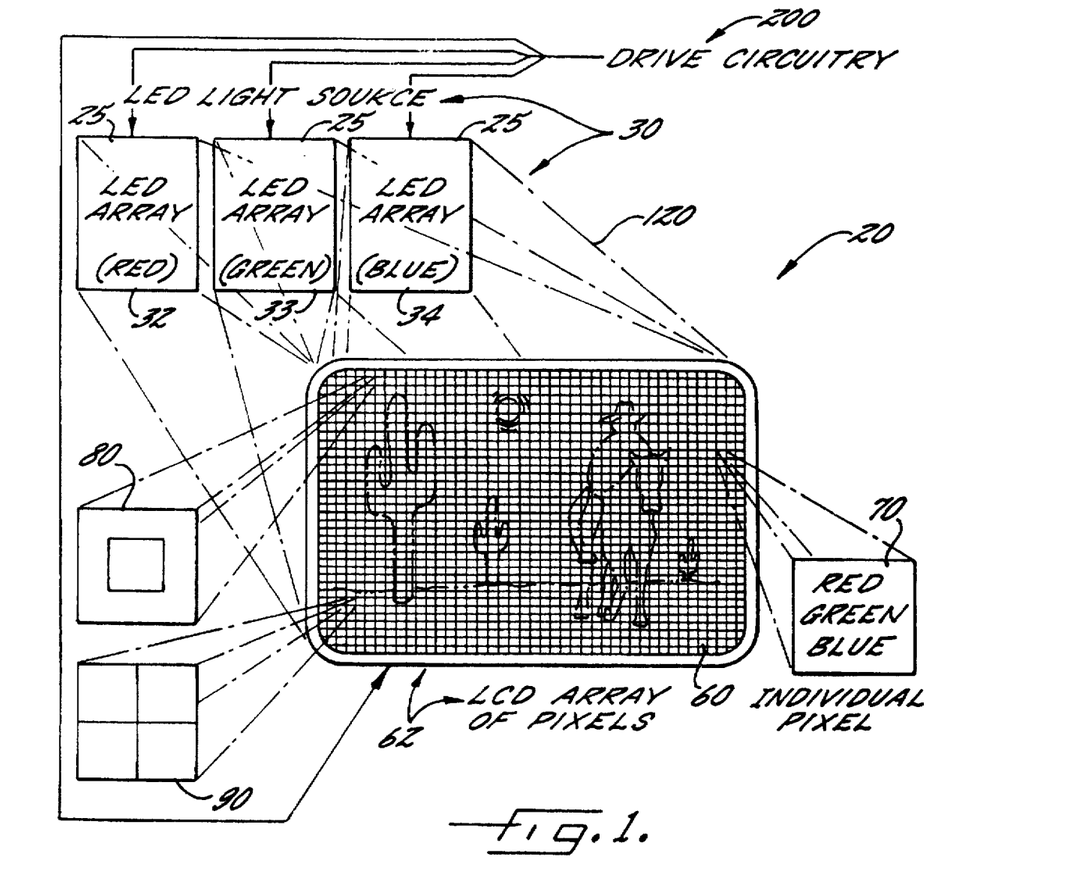
FIG. 1 is a perspective view of an LED array in combination with an LCD according to a first embodiment of the present invention.
Figure 2:
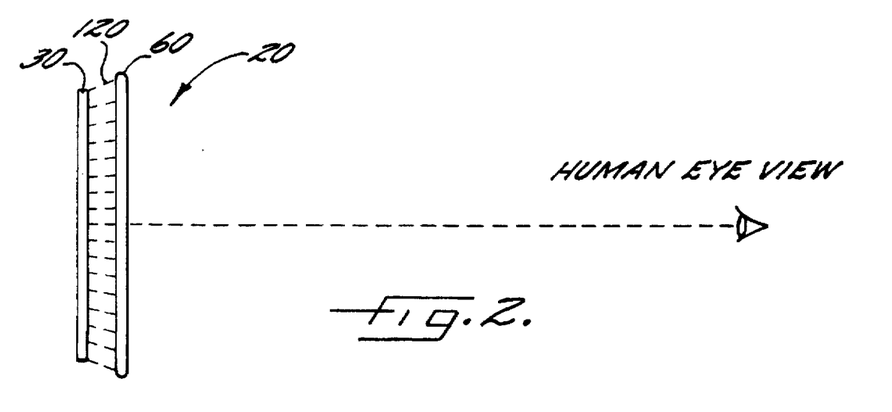
FIG. 2 is a side view of a high resolution, high brightness, full color, flat panel display according to a first embodiment of the present invention.
Figure 3:
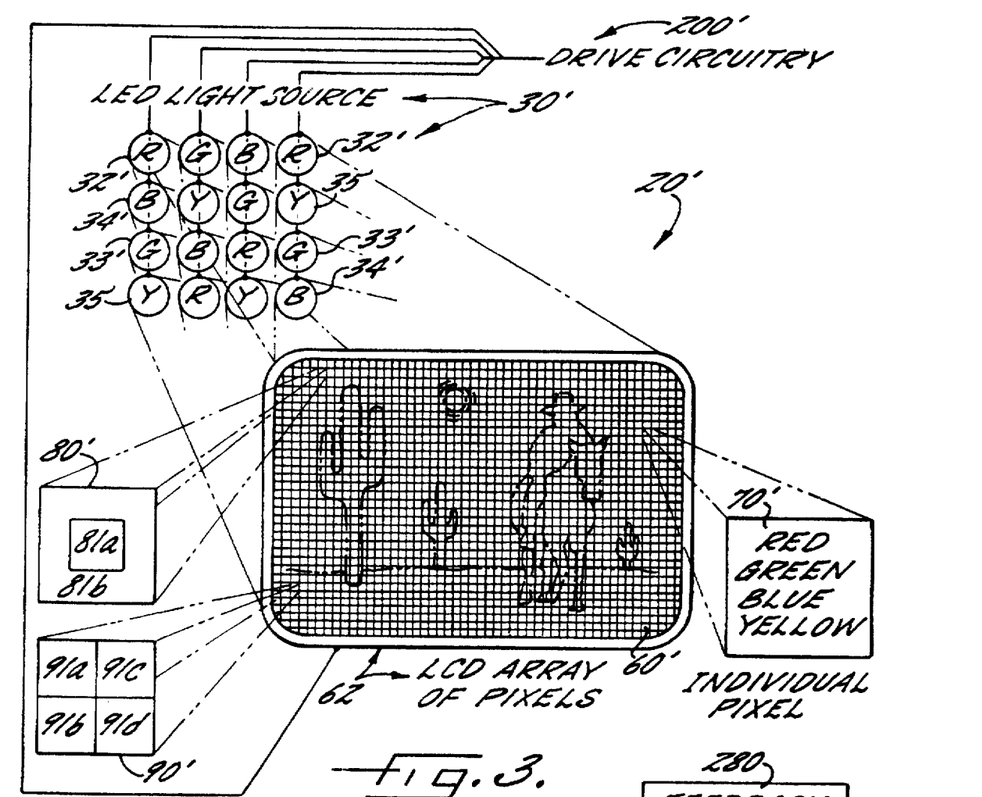
FIG. 3 is a perspective view of interspersed LEDs in combination with an LCD according to a second embodiment of the present invention.

Referring now to FIGS. 1–4, shown are perspective and side views of a display 20 and 20' according to respective first and second embodiments of the present invention. Like elements in the second embodiment have been designated with prime (') notation. The display 20 has an array 25 of light emitting diodes ("LED") as a light source 30. The LED array 25 has a set of at least one red 32, one green 33, and one blue 34 LED, but preferably rows and corresponding columns of interspersed colors of LEDs 32, 33, 34, 35 as illustrated in FIG. 3 would be used. FIG. 1 illustrates the arrangement of the LEDs in a particular array pattern, but other patterns well known to those skilled in the art, including interspersing the colors of the LEDs as illustrated in FIG. 3, are also applicable to this invention.

The array 25 of LEDs may also be intertwined so as not to have three clearly divided color arrangements of the LEDs. Although the light source 30 is preferably formed of light emitting diodes, according to some embodiments of the present invention, other types of light sources such as lasers, vacuum fluorescent, plasma, electroluminescence, or incandescent or fluorescent lamps and the like, well known to those skilled in the art, may also be used. The light source 30 may also be a mix of various types of light sources as described by example above. Although not preferable, filters may be used with some embodiments, if needed, with these various light sources to obtain the various colors desired. In addition, a yellow LED 35 or light source may be used in addition to or instead of the blue 34 LED for some display applications where the yellow color or a combination thereof is desired.

As described in copending U.S. patent application Ser. No. 07/926,035 filed on Aug. 5, 1992, which is hereby incorporated herein in its entirety by reference, the blue 34 LED is preferably formed in silicon carbide (SIC) and may be formed in accordance with U.S. Pat. Nos. 4,918,497 and 5,027,168 to Edmond titled "Blue Light Emitting Diode Formed In Silicon Carbide." Accordingly, these patents are also hereby incorporated herein by reference in their entirety. The blue LED 34 is preferably formed of a SiC substrate and a gallium nitride (GAN) p-n junction device positioned thereon for higher brightness and longer lifetime output. Such blue LEDs are further described in a U.S. patent application titled "Vertical Geometry Light Emitting Diode with Group III Nitride Active Layer and Extended Lifetime" filed on Sep. 20, 1994, Ser. No. , which is also incorporated herein in its entirety by reference.

Figure 4:
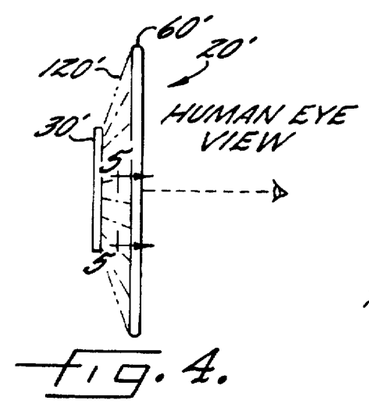
FIG. 4 is a side view of a high resolution, high brightness, full color, flat panel display according to a second embodiment of the present invention.

Red, yellow, and green LEDs are typically formed in Gallium Phosphide (GAP), Gallium Arsenide Phosphide (GaAsP), Aluminum Gallium Arsenide (AlGaAs), or other like materials for LEDs well known to those skilled in the art. The red LED 32 is preferably formed of AlGaAs and the yellow, if used, is preferably formed of GaP. The green LED, however, is also preferably formed of SiC or GaN. Such a green LED is further described in a U.S. patent application titled "Green Light Emitting Diode Formed in Silicon Carbide" filed on Aug. 12, 1994, Ser. No. 08/290,020, which is further incorporated herein in its entirety by reference. Because the LEDs 32, 33, 34, 35 according to the invention preferably have a high light intensity output, a much smaller number of LEDs 32', 33', 34', 35 than individual liquid crystal pixels 70' may be used for the display 20' as best illustrated in FIGS. 3 and 4.

It will also be understood that the blue LED 34 according to the present invention may be formed of a GaN p-n junction device positioned on various other substrates such as silicon (Si), sapphire, gallium arsenide (GaAs), aluminum nitride (AlN), or GaN. The blue LED may also be formed of a zinc selenide (ZnSe) p-n junction device positioned on substrates formed of GaAs or ZnSe.

Referring again to FIGS. 1–4, the display 20, 20' has an array 62 of individual pixels 70 of an LCD 60 positioned adjacent the LED light source 30 so that light emitted by the LEDs 32, 33, 34 of the light source 30 is directed onto the back surface of the individual pixels 70, through the individual pixels 70, and outwardly from the front surface of the individual pixels 70. The individual pixels 70 of the LCD 60 are used to shutter the light being emitted from the LED light source 30 through the individual pixels 70, 80, and 90.

The individual pixels 70 typically have one liquid crystal covering each color pixel, but each color pixel may have more than one liquid crystal, i.e., individual portions, per pixel as shown in the exploded view of the pixels 80, 90 in FIGS. 1 and 3. The liquid crystals 81a–81b, 91a–91d of each pixel 80, 90 are also preferably all selectably addressable by appropriate circuitry. The liquid crystal pixels are preferably arranged in rows and corresponding columns to form a flat panel display 20, 20' as seen in side views illustrated in FIGS. 2 and 4. The pixels 70, 80, and 90 must be individually selectably addressable at a high enough rate whereby changes in the opening and closing of the entire pixel 70, 80, and 90, or portions 81a–81b, 91a–91d thereof, are not detected by the human eye as the LED light source 30 emits light therethrough.

A diffusant 120, or other like device well known to those skilled in the art, formed of glass, plastic, or other like material is preferably located between the LED light source 30 and the LCD 60 to evenly disperse the LED light and channel the light from the array 25 of LEDs on the LCD 60 screen and thereby allow each individual liquid crystal pixel 70 to receive the full intensity of the light emitted from the red 32, green 33, or blue 34 color from the array 25 of LEDs. The diffusant 120 may also be a faceted plastic or other material necessary to accomplish the even dispersion or homogenization of the light emitted from the LEDs 32, 33, 34, 35. The red 32, green 33, and blue 34 LEDs may be interspersed within the array 25 and still have the light from the LEDs evenly dispersed by the diffusant screen 120. Also, for some applications, a diffusant may not be desired. Collimators, for example, may also replace or be used in conjunction with the diffusant 20 to further channel light from the array 25 of LEDs to the LCD 60 in various arrangements of the LEDs.

The display 20 is also provided with the associated drive circuitry 200 necessary for selectably addressing individual liquid crystal pixels 70 of the LCD 60 and for sequentially and cyclically driving the LEDs 32, 33, 34. It is also understood by those well skilled in the art that a set of one red 32 LED, one green 33 LED, and one blue 34 LED could be directly placed behind the individual selectably addressable liquid crystal pixel 70 to emit light therethrough.

Figure 7:
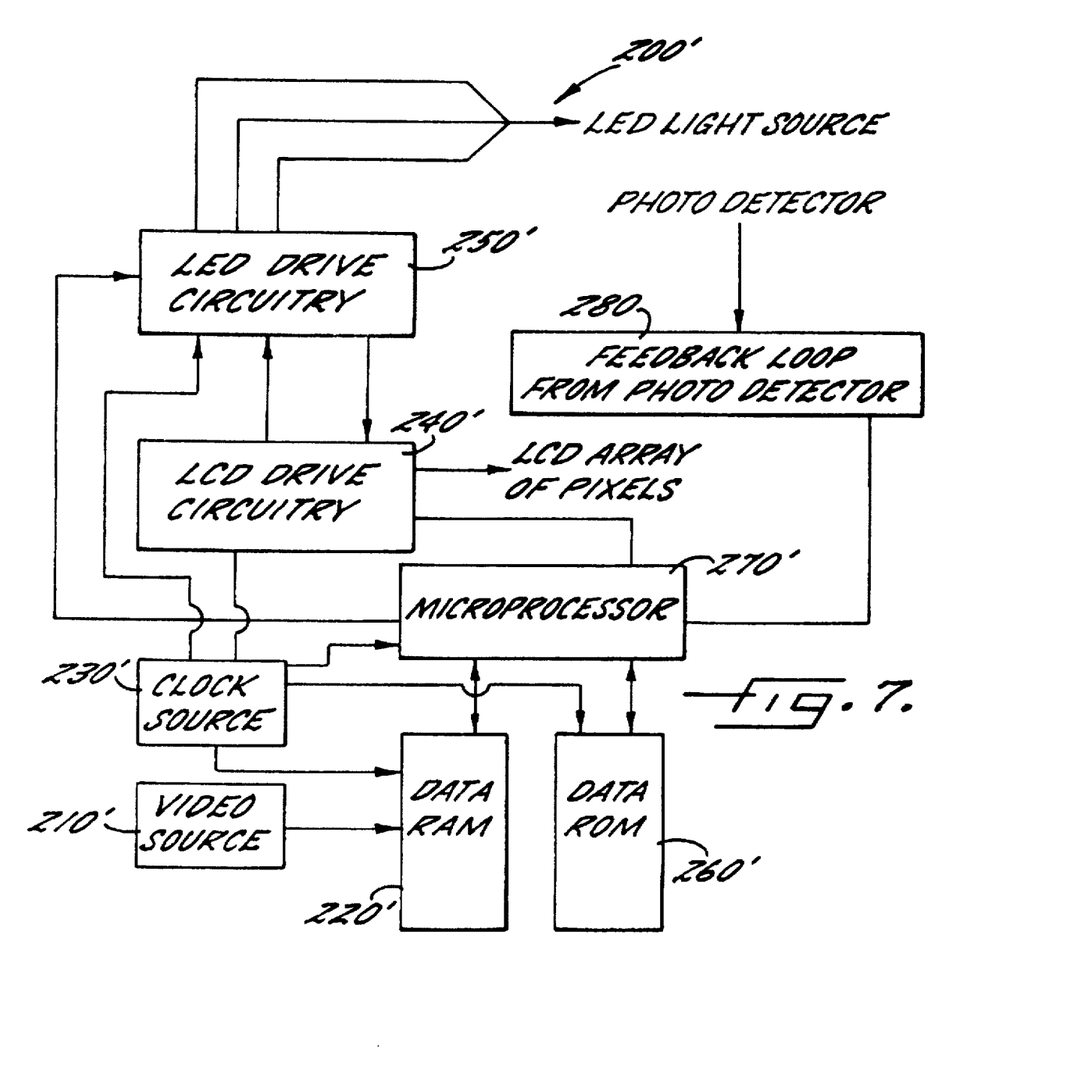
FIG. 7 is a schematic electronic circuit diagram of the display according to the present invention.

FIGS. 1, 3, and 7 further illustrate the electronic circuitry 200' and operation of the display 20, 20'. A video signal is received and then transmitted from a video source 230' to a data random access memory ("RAM") 220'. A clock signal is transmitted from a clock source 238' to the data RAM 220' to synchronize the video data transmitted to the array 25 of LEDs and the individual liquid crystal pixels 70 of the LCD 60. The individual pixels 70 of the LCD 60 are controlled and driven by the LCD drive circuitry 240' over time to allow only the appropriate amount of color through the liquid crystal pixel 70 as required to reproduce the video imaging or other data to be perceived by the human eye. The human eye cannot detect a change in color that takes place generally in less than one sixtieth (1/60th) of a second.

Figure 10:
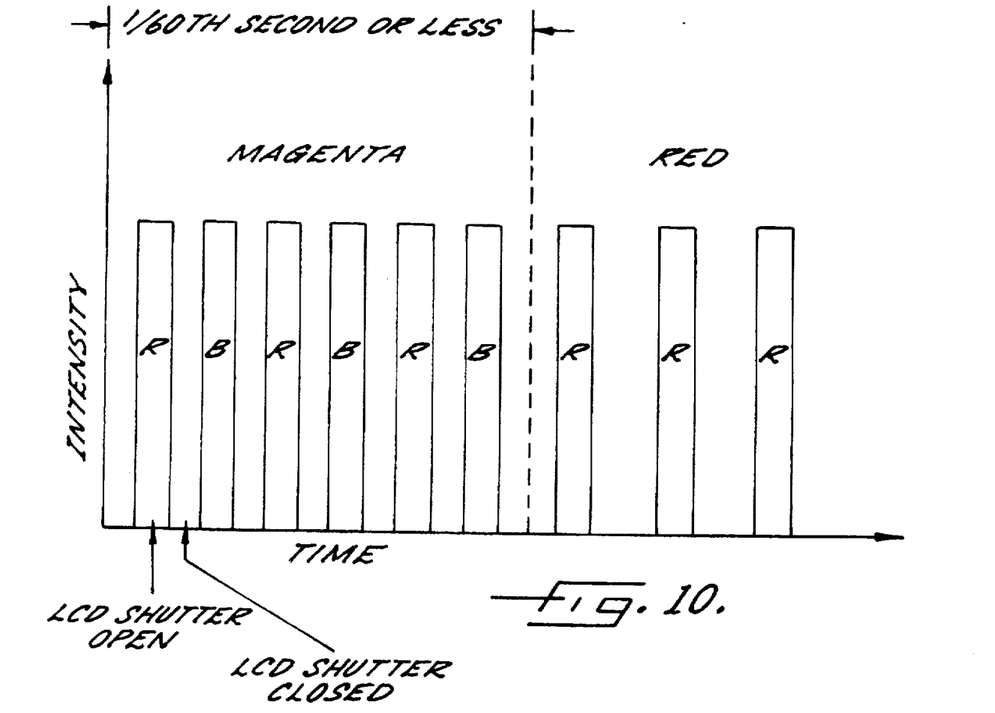
FIG. 10 graphically illustrates color wrapping pulses of the light source over time with the shuttering of a liquid crystal pixel a high number of times to define each color, thereby providing persistence.

To prevent what is commonly referred to as the "fritto effect" (named after the rapid eye movement which occurs when biting on a corn chip) wherein the human eye detects changes in color that could occur when the red 32, green 33, and blue 34 LED color pulses are blended over time, the invention allows a large number of red 32, green 33, and blue 34 color pulses to occur within the time frame that is less than the threshold perceivable by the human eye. In effect, as shown in FIG. 10, the desired color is created by "wrapping" many red 32, green 33, and blue 34 pulses together in a time frame that is less than the threshold perceivable by the human eye. For example, to create the appearance of the color magenta in a given pixel, the LCD shutter could select from (or open) a string of 0.5 millisecond red 32, green 33, and blue 34 light pulses only the red 32 and blue 34 light all within a time frame less than what the human eye could detect color changes. Creating a color from very short pulses lowers the probability that the human eye would perceive the individual light pulses when rapid eye movement occurs from blinking (or biting on a "fritto," for example).

In addition, the string of color pulses may overlap in a way so that the eye does not perceive a flicker in the display. For example, a low level of green 33 can proceed each green 33 pulse and the same for red 32 and blue 34. Also, in a string of light pulses that do not overlap, the LCD shutter could remain open at a minimum level during all colors, providing no time period when light is not transmitted through the pixel, but just opening much wider than the minimum level to allow the definition of a particular color other than white.

Further, more than one liquid crystal shutter can be used to define one pixel as previously discussed. For instance, with an inner and an outer shutter 80 or a block of shutters 90, as shown in FIGS. 1 and 3, the display 20, 20' can allow part of the color string through while another provides a background light for persistence. Also, with the multiple shutter approach for a single pixel, the multiple shutters can be used to provide a means for transmitting very short light pulses when the LCD switching speed is slow. In addition, advanced LCD technology that provides semiconductor films with high electron mobility such as, but not limited to, single crystalline semiconductor layers may be used to form the drive transistors so that the LCD switching speed will increase significantly. This will allow even shorter color pulses thereby providing a screen with better control of flicker ("fritto effect") and improved persistence.

The LEDs 32, 33, 34, 35 are preferably driven sequentially and cyclically by the LED drive circuitry 250 to continuously emit light from the individual liquid crystal pixels 70. As illustrated in FIG. 3, where the LEDs 32', 33', 34', 35 have a high enough intensity output over time, the LEDs 32', 33', 34', 35 may be randomly driven to provide a high resolution display 20' with minimal or no flicker. The LEDs 32; 33', 34', 35 are driven, pulsed, or strobed at a rate fast enough to avoid the detection of flickering from the LEDs and fast enough to provide color wrapping and persistence from the LCD 60. Color wrapping occurs where the red, green, yellow, and blue colors and related shades of these colors are changed at a rate fast enough so as to create the appearance of different colors or shades of color when seen by the human eye.

LEDs generally may be cycled at rates of thousands of times per second or faster. The individual liquid crystal pixel 70, 80, and 90 selects the color needed from individual pulses of the LEDs 32, 33, 34, 35 as they are sequentially cycled. Therefore, many of red 32, green 33, blue 34, and yellow 35 LED cycles take place in a time period generally less than the time required for the human eye to detect color changes. In order to wrap colors, a large number of pulses can be emitted by the LEDs 32, 33, 34, 35, the intensity of the pulses can vary over time, the pulse width can vary over time, and a grey scale may be used with the liquid crystal pixels 70, 80, and 90 to partially open or close the liquid crystal pixels 70, 80, and 90 over time.

Referring again to FIGS. 1, 3, 7, and 9, data for the colors corresponding to the required amount of red 32, green 33, blue 34, and yellow 35 light to be emitted from the LEDs, as well as the amount of time to open the individual liquid crystal pixels 70, 80, and 90 to shutter and, thereby, transmit the desired color, is stored in the data read only memory ("ROM") 260' and retrieved by the microprocessor 270'. The microprocessor 270', in turn, controls the flow of information for the LEDs 32, 33, 34, 35 and the individual liquid crystal pixels 70, 80, and 90 for the LCD 60. The information retrieved from the data ROM 260' is synchronously transmitted to the individual liquid crystal pixels 70, 80, and 90 and LEDs 32, 33 34, 35 by the clock source 230' and data RAM The shuttering of the individual liquid crystal pixels 70, 80, and 90 and the lighting of the array 25 of LEDs generally occurs rapidly enough so as not to allow changes of color to be perceived by the human eye. For example, since the changes are required to occur in generally less than 1/60th of a second, each of the three LEDs 32, 33, 34 may be cycled an equal amount of time, which must be generally less than 1/180th of a second for each set of LEDs. The display, however, may also vary the cycle time for each of the individual LEDs as needed so that one may be cycled for 1/200th of a second, one for 1/360th of a second, and one for 1/150th of a second, all of which total less than the 1/60th of a second. It is also considered herein that a cycle may include having one or more of the LEDs 32, 33, 34 pulsed off or having very little light emitted therefrom.

Figure 5:
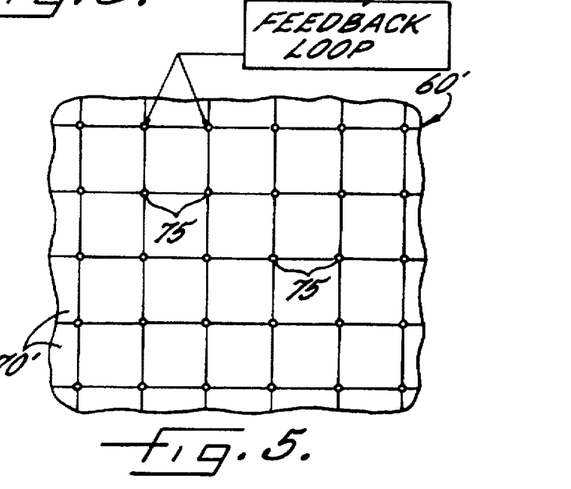
FIG. 5 is an enlarged fragmentary view of a back side of an LCD according to a second embodiment of the present invention taken along line 5—5 of FIG. 4.

FIG. 5 schematically illustrates that according to a second embodiment of the display 20' of the invention, means, shown as photodetectors 75 in a first embodiment thereof, are preferably positioned within a back side of the LCD 60' and outside of a front view of the display 20' for measuring the light output of the LEDs 32', 33, 34', 35 over time. The measuring means, however, may include other forms of measuring either the light output of the LEDs 32', 33', 34', 35 or other electrical or optical characteristics of thereof. The photodetectors 75 preferably detect the light emitted from the LEDs 32', 33', 34', 35 and provide feedback through a feedback loop 280 to the microprocessor 270' to thereby determine the amount of light output of the LEDs 32', 33', 34', 35 over time. The feedback loop 280 preferably include signal processing hardware and/or software for processing the signal before communicating with the microprocessor 270'. This hardware/software preferably includes amplification and filtering, i.e., bandpass filter, of the electrical signal produced from the detected light.

The light output measuring means of the display 20', for example, may then signal a user if a particular LED degrades or fails and needs to be replaced. The light output measuring means may also be used, for example, to provide a signal to the microprocessor 270' and thereby compensate for an LED that is degrading or has failed. Based on the feedback to the electronic circuitry 200' by the measuring means and the feedback loop 280, the microprocessor 270' can also adjust the display 20' for color changes as well as power changes over time such as by a predetermined software or command sequence.

Figure 6:
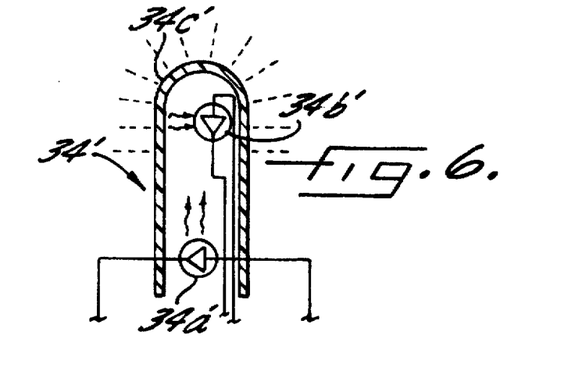
FIG. 6 is a schematic vertical sectional view of an LED having a photodetector positioned within an encapsulated body according to the present invention.

FIG. 6 illustrates a second embodiment of the light output measuring means of the display 20' wherein a photodetector 34b' is positioned within an encapsulated housing 34c' of the LED 34 so that light emitted from the light emitting diode cell 34a' is detected by the photodetector 34b'. The photodetector 34b' is likewise preferably electrically connected to the feedback loop 280 which in turn connects to the microprocessor 270'.

Figure 8A:
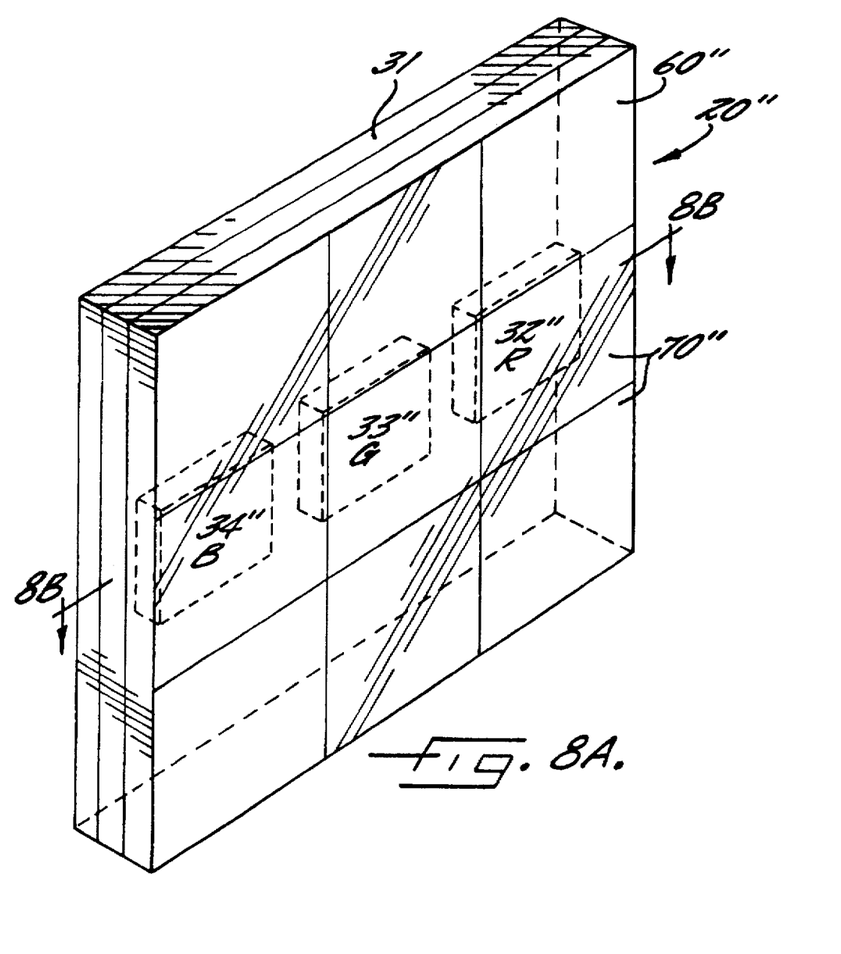
FIG. 8A and 8B illustrate LEDs formed in a common substrate in combination with an LCD according to a third embodiment of the present invention.
Figure 8B:
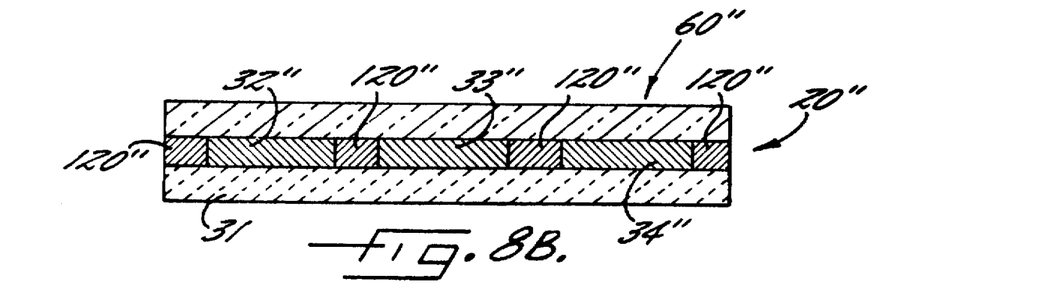

FIGS. 8A and 8B illustrate LEDs 32", 33", 34" formed in a common substrate 31 in combination with an LCD 60" according to a third embodiment of the display 20" according to the present invention. Like elements in this embodiment are illustrated with the double prime (") notation. The liquid crystal pixels 70" preferably overlie the LEDs 32", 33", 34" as illustrated. The LEDs 32", 33", 34" are preferably surrounded by diffusant 120" and have a much smaller number than of individual liquid crystal pixels 70".

Figure 9:
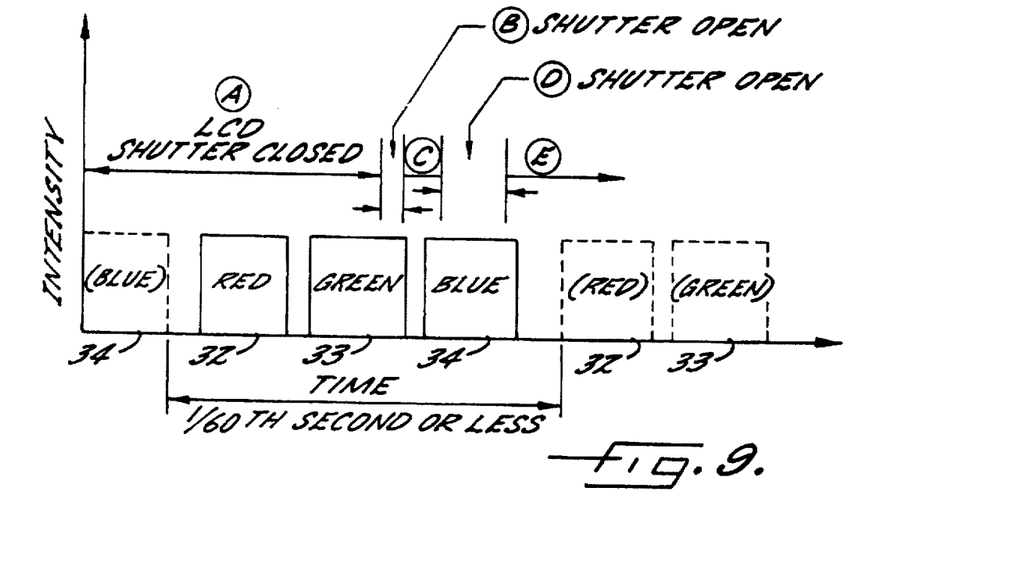
FIG. 9 graphically illustrates time versus intensity for the sequentially and cyclically lighting of the LEDs and the shuttering of the individual pixels of the LCD as perceived by the human eye according to the present invention.

FIG. 9 graphically illustrates time versus intensity for the sequentially and cyclically lighting of the LEDs 32, 33, 34 and the shuttering of the individual liquid crystal pixels 70 to have only the desired color emitted therefrom. The liquid crystal pixels 70 are shuttered to determine the amount of time that the individual pixels 70 are exposed to the continuous LED light source 30. The LEDs 32, 33, 34 can be cycled at rates of thousands of times per second or faster and thereby allow light to be continuously emitted from the liquid crystal pixels 70 as needed.

For example, in FIG. 9, to produce a light blue color visible as such to the human eye, then the liquid crystal pixel 70 is shuttered over time to allow only this color to be emitted therefrom. FIG. 9 illustrates five time intervals, A through E. During interval A, the liquid crystal pixel 70 is shuttered closed. Interval A includes the entire red 32 LED cycle and the majority of the green 33 LED cycle. At some point during the green 33 LED cycle, however, and as indicated by interval B, the liquid crystal pixel 70 is shuttered open so that some portion of the green 33 LED light is transmitted from the pixel 70. During interval C, the pixel 70 is again shuttered closed, and then during interval D, the pixel 70 is again shuttered open for the majority of the blue 34 LED cycle. The pixel 70 is shuttered closed during interval E.

The result is that during a period of time which is less than that in which the human eye can perceive a difference, the particular pixel 70 represented by the graph has been permitted to emit green 33 LED light for a relatively short period of time and blue 34 LED light for a relatively longer period of time. Therefore, even though these colors were emitted successively from the pixel 70, rather than concurrently, the eye perceives them as being mixed to give the desired light blue color. Successive cycles of the red 32, green 33, and blue 34 LED light are shown in dotted form, and the shuttering pattern illustrated could be repeated as many times as necessary to define the display pattern desired. It is also understood by those well skilled in the art that in order to achieve a white light, as needed, the red 32, green 33, and blue 34 LEDs are driven to turn on and the liquid crystal pixel is shuttered open.

In using the invention, video or other images are constantly displayed as each pixel 70, 80, and 90 selects the amount of color from the sequentially and cyclically driven light source 30 necessary to define the required color while also providing persistence. Hence, the average power transmitted or brightness level can be excellent, and because the light is emitted from each pixel 70, 80, and 90 individually, the contrast and resolution can also be better than previous flat panel displays.

In the drawings and specification, there have been disclosed typical, preferred embodiments of the invention, and although specific terms are employed, the terms are used in a descriptive sense only and not for purposes of limitation. The invention has been described in considerable detail with specific reference to various preferred embodiments. It will be apparent, however, that various modifications and changes can be made within the spirit and scope of the invention as described in the foregoing specification and as defined in the appended claims.

That which is claimed is:

1. A high resolution, full color display, comprising:
    a liquid crystal pixel selectably addressable during a predetermined time period wherein said liquid crystal pixel comprises an array of individual portions of a liquid crystal pixel and wherein each individual portion of said pixel is individually addressable over the predetermined time period;
    an interspersed set of at least one red, one green, and one blue color light emitting diodes positioned adjacent said liquid crystal pixel and adapted for emitting light through said liquid crystal pixel; and
    means connected to said liquid crystal pixel for selectably addressing the liquid crystal pixel a plurality of times during the predetermined time period so as to provide persistence when changes in color occur.

2. A high resolution, high brightness, full color display as defined by claim 1, wherein said liquid crystal pixel is selectably addressable for an amount of time generally less than the amount of time that the human eye can detect changes in colors.

3. A high resolution, high brightness, full color display as defined by claim 1 further comprising:
    means connected to safe interspersed set of LEDs for lighting said interspersed set of LEDs by respective red, green, and blue colors for a predetermined time period for each color.

4. A high resolution, high brightness, full color display according to claim 1, further comprising:
    means connected to said set of LEDs and said liquid crystal pixel for synchronizing the lighting of said interspersed set of LEDs with the means for addressing said individual liquid crystal pixel a plurality of times during the predetermined time period.

5. A high resolution, high brightness, full color display according to claim 1, further comprising means positioned between said LEDs and said LCD for measuring the intensity of said LEDs during a time interval.

6. A high resolution, high brightness, full color display according to claim 1, further comprising means positioned between said set of LEDs and said liquid crystal pixel for diffusing the light emitted from said set of LEDs to said liquid crystal pixel.

7. A high resolution, high brightness, full color display as defined by claim 1, wherein said blue LED is formed of gallium nitride.

8. A high resolution, high brightness, full color display as defined by claim 1, wherein said array of LEDs are formed in a single semiconductor substrate.

9. A method of producing a high resolution, high brightness, full color display that is particularly useful for a flat display, comprising the steps of:
    lighting a set of one red, one green, and one blue LEDs by lighting the respective LEDs in the set for a predetermined time period for each LED in which one cycle is defined by the sum of the predetermined time periods, and in which one cycle is a time period less than that for which the sequential lighting of the LEDs can be detected by the human eye; and
    shuttering the set of LEDs with a liquid crystal pixel which comprises an array of individual portions of a liquid crystal pixel for at least a portion of the predetermined time periods to thereby emit light from the shuttered pixel for a selected time period from each of the red, green, and blue LEDs so that the light emitted from the pixel is an emission of red, green, and blue light, each for a time period less than or up to the predetermined time period so that the emission from the pixel during each cycle is defined by the amount of time a light pulse from each LED is shuttered and will normally be perceived by a human eye as a blend of the colors emitted by the respective LEDs.

10. A method as defined by claim 9, further comprising the step of:
    selectably addressing the liquid crystal pixel a plurality of address times during each predetermined time period.

11. A method as defined by claim 10, further comprising the step of:
    synchronizing the addressing of the liquid crystal pixel with the lighting of the set of red, green, and blue LEDs.

12. A method as defined by claim 9, wherein one cycle is less than the amount of time that the human eye can detect changes in colors.

13. A method as defined by claim 9, wherein one cycle is generally less than 1/60th of a second.

14. A method as defined by claim 9, wherein the predetermined time period is generally less than 1/180th of a second.

15. A method of producing a high resolution, high brightness, full color display that is particularly useful for a flat display, comprising the steps of:
    transmitting data to the display to be represented during a predetermined time period;
    receiving the data to be represented for display during the predetermined time period;
    sequentially and cyclically lighting an interspersed set of red, green, and blue LEDs in response to the received data by lighting the respective LEDs in the set for a predetermined time period for each color, in which one cycle is defined by the sum of the predetermined time periods, and in which one cycle is a time period less than that for which the sequential lighting of the LEDs can be detected by the human eye;

addressing individually the liquid crystal pixels in a set of liquid crystal pixels wherein at least one of said liquid crystal pixels comprises an array of individual portions of a liquid crystal pixel and wherein a liquid crystal pixels in the set of liquid crystal pixels is addressed individually a plurality of address times during each sequential predetermined time period in response to said received data;

synchronizing the addressing of the individual liquid crystal pixels with the sequentially and cyclically lighting of the set of red, green, and blue LEDs; and shuttering the set of LEDs with individual pixels in the set of liquid crystal pixels for at least a portion of the sequential predetermined time periods in response to said received data to thereby emit light from the shuttered pixels for a selected time period from each of the red, green, and blue LEDs so that the light emitted from the pixel is a sequential emission of red, green, and blue light, each for a time period less than or up to the predetermined time period so that the emission from the pixels during each cycle is defined by the amount of time a light pulse from each LED is shuttered and will normally be perceived by a human eye as a blend of the colors emitted by the respective LEDs rather than as a sequential appearance of those colors.

16. A method as defined by claim 15, wherein one cycle is generally less than 1/60th of a second.

17. A method as defined by claim 15, wherein said predetermined time period is generally less than 1/180th of a second.

* * * * *